Figure 1:
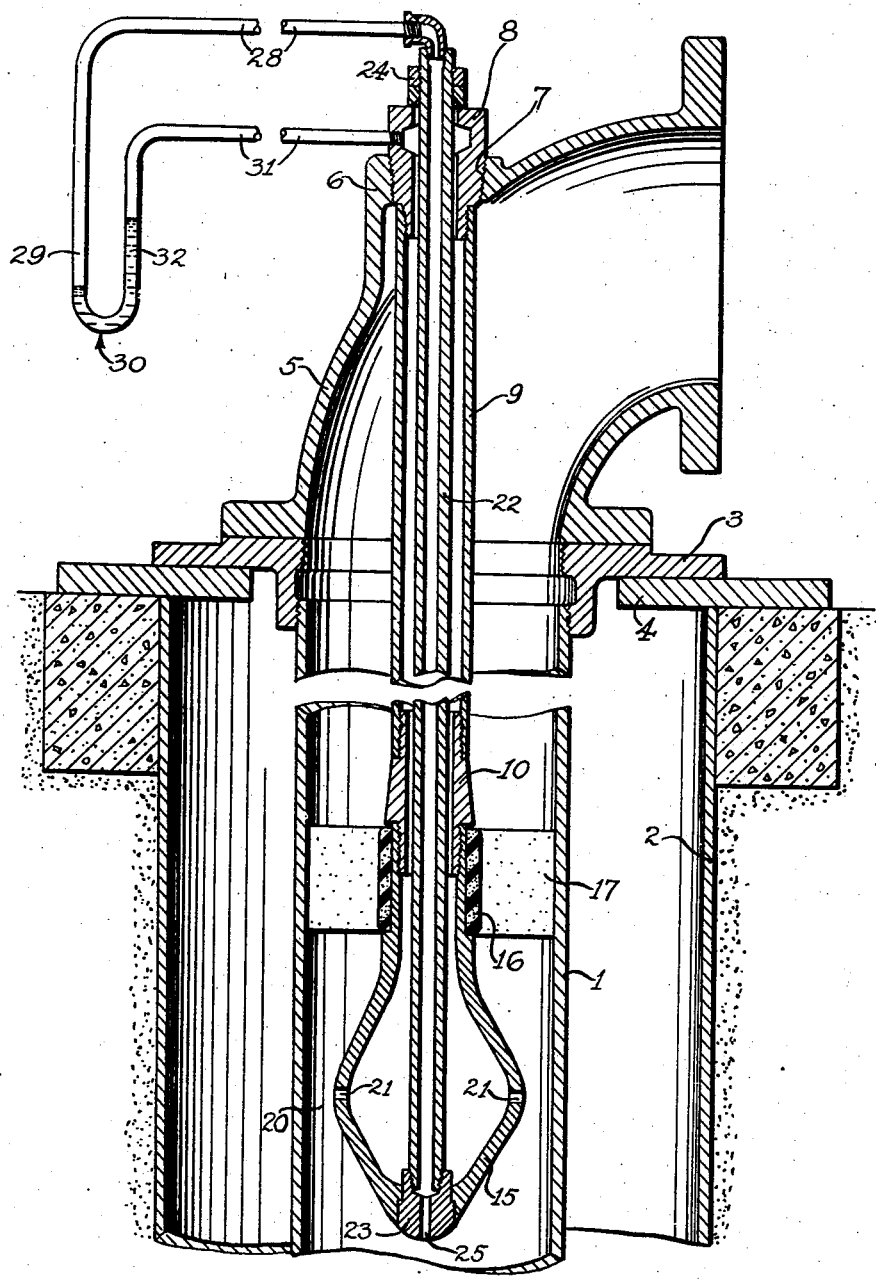

Aladar Hollander
INVENTOR

April 16, 1940. A. HOLLANDER 2,197,214
FLOW METER
Filed April 26, 1939 2 Sheets-Sheet 2

Aladar Hollander
INVENTOR
BY John D. Chesnut
ATTORNEY

Patented Apr. 16, 1940

2,197,214

UNITED STATES PATENT OFFICE 2,197,214

FLOW METER

Aladar Hollander, Los Angeles, Calif., assignor to Byron Jackson Co., Huntington Park, Calif., a corporation of Delaware Application April 26, 1938, Serial No. 204,346

1 Claim. (Cl. 73—213)

This invention relates generally to flow meters, and more particularly to a flow meter of the pressure differential type.

In the usual Venturi meter, the primary element consists of a Venturi tube comprising a converging section and a diverging section of pipe interposed in the fluid conduit, the smaller ends of the sections being connected by a short cylindrical section termed the throat. Piezometer tubes are connected respectively at the throat and at the approach thereto, to transmit the pressures at these points to the secondary element which measures the pressure differential.

The degree of accuracy of a Venturi meter depends chiefly on two factors, namely: (1) the amount of disturbance in the stream on the upstream side of the throat; and (2) the amount of deflection in the secondary element. A smooth, straight approach of uniform diameter, with no obstructions or irregularities for a considerable distance, is required for maximum accuracy. Also, the greater the deflection in the secondary element, or in other words the greater the pressure differential, the higher the degree of accuracy obtainable.

A principal object of this invention is to provide a Venturi meter in which the approach is perfectly smooth and free of all disturbing elements, the wall of the conduit being an unbroken cylinder extending from the downstream side of the primary element to a point sufficiently upstream therefrom to insure uniform flow conditions.

An objectionable feature of the standard Venturi meter in many instances is the fact that installation of the Venturi tube necessitates separating the conduit sections at the point where the tube is to be inserted. Inasmuch as a straight approach of considerable length and a short downstream section, both of uniform cross-section, must be provided to insure uniformity of flow, this requirement together with the requirement that the point of installation of the tube be accessible results in the usual provision of at least 20 diameters of readily accessible straight conduit solely for this purpose.

A further and important object of this invention is to provide a flow meter which is insertible into and removable from a fluid conduit without disturbing the conduit at the point where the meter is located. The meter is insertible into the conduit at a remote point and may be positioned at a point which is not accessible from the outside. In this way a straight section of inaccessible pipe of sufficient length may be utilized as the approach and receding sections for the meter. An example of this is the utilization of the upper portion of the discharge column of a deep well pump. The meter of this invention may be inserted through the discharge elbow at the surface and moved the desired distance downwardly within the column. To install a standard Venturi meter in such a conduit it would be necessary to raise the discharge column upwardly out of the well and disconnect the sections. Since there no pipes or connections on the outside of the conduit are required with my novel meter, it may be installed in the discharge column of a bored well only slightly larger than the column. A standard Venturi meter could not be installed under these conditions, because of the outside tubes.

The two foregoing objects, namely the increased accuracy and ease of insertion and removal, are accomplished by the provision of a removable restriction in which the pressure tubes are incorporated. The high pressure tube is disposed with its open end at the upstream extremity of the restriction and exposed to the combined static and velocity head of the fluid, while the low pressure tube terminates opposite the restricted passage formed around the restriction, the open end of the low pressure tube being disposed parallel to the direction of flow so as to be subjected only to the pressure head in the restricted passage. The restriction is mounted on the inner end of an elongated supporting member extending to a remote point on the downstream side of the restriction.

A further object of this invention is to provide a removable flow meter of the pressure differential type wherein the pressure tubes are connected to a removable restriction member so as to be insertible and removable therewith as a unit, the entire unit being attached to a supporting member manipulable from a remote point.

Figure 2:
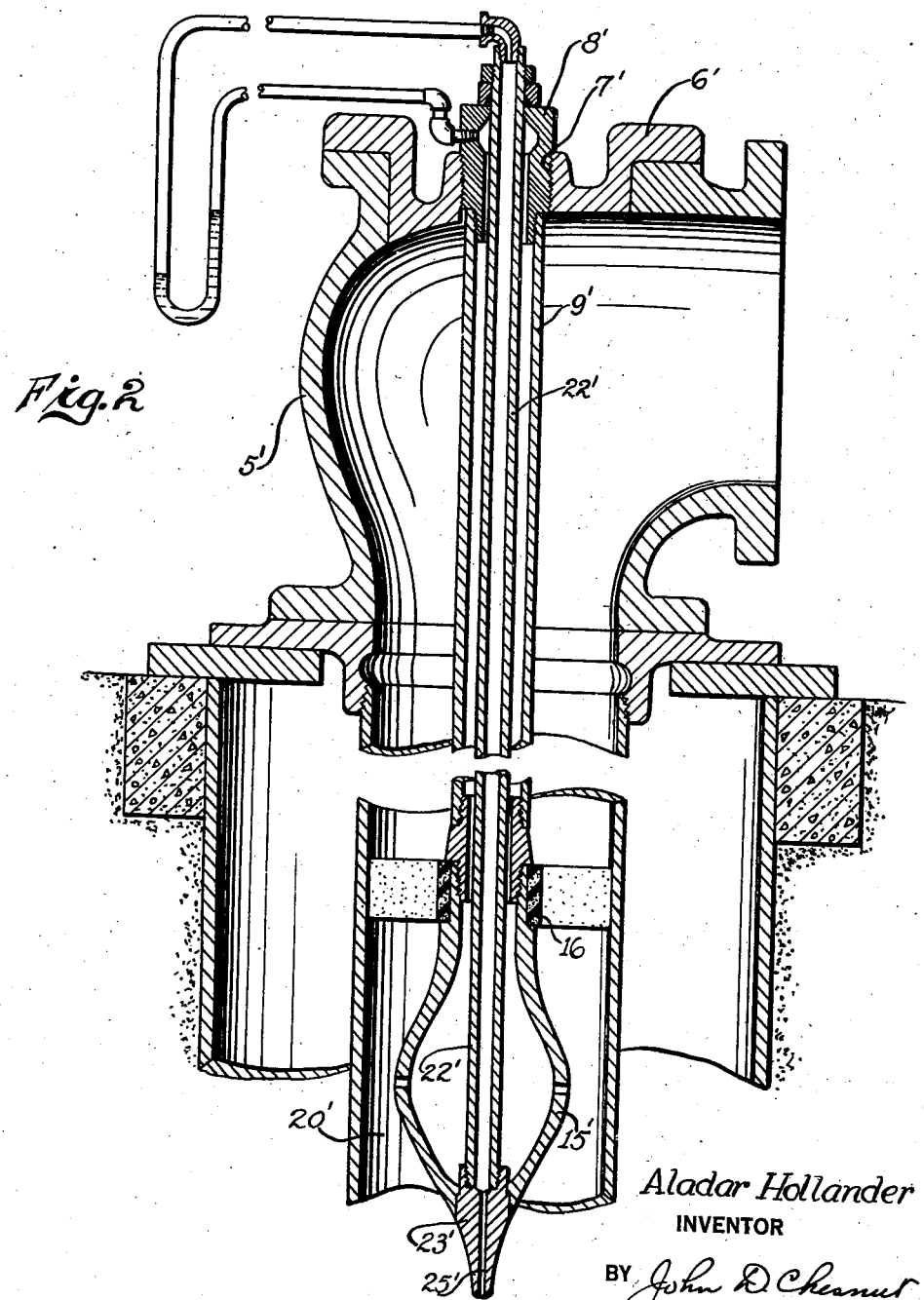

Other more specific objects and advantages will become apparent from the following description taken in conjunction with the accompanying drawings, wherein:

Fig. 1 is a longitudinal section through the upper portion of a well, showing a flow meter installed therein in accordance with this invention; and Fig. 2 shows a modified form of mounting for the meter and slightly modified obstruction.

Referring to Fig. 1 of the drawings, the invention is shown as applied to the discharge column of a well pump, illustrating a typical instance of a situation wherein the invention is particularly advantageous. A discharge column 1 is suspended within a well casing 2, the column being threadedly connected to and supported by a special flange 3 resting on a base plate 4 supported by a suitable foundation at the top of the well. The discharge column extends downwardly within the casing to a point adjacent the level of the well liquid, and has a pump connected to the lower end thereof. The pump may be driven by a submersible electric motor also supported from the lower end of the discharge column, leaving the latter free of shafting or other elements which might disturb the uniformity of flow of pumped liquid.

A discharge elbow 5 is connected to the upper end of the discharge column. A flange 6 is formed on the elbow, defining a threaded opening 7 coaxial with the discharge column. An annular plug 8 is threaded in the opening, and the lower end of the plug is threadedly connected to an elongated tube 9, preferably of brass or other noncorridible material. The tube is of a length to extend downwardly within the discharge column a sufficient distance to eliminate the effect of the elbow 5 on the pressure differential readings, and has a coupling 10 connected to the lower end thereof. Secured to the coupling is a hollow member 15 having an enlarged central portion tapering toward each end. The enlarged central portion is supported substantially concentrically within the column 1 by a spider of rubber or other resilient material, the spider having a central hub 16 supported between opposed shoulders on the coupling 10 and member 15, and a plurality of radially extending webs 17.

An annular channel 20 of reduced cross-sectional area with respect to the full area of the column 1 is thus formed between the member 15 and the column, the channel corresponding to the restricted throat of a standard Venturi tube. A number of relatively small holes 21 are formed in the member 15 at the cylindrical section of the enlarged central portion thereof, the faces of the holes being disposed parallel to the direction of flow of the fluid and consequently subjecting the interior of the member 15 to the pressure head in the stream at that point.

A second tube 22 is supported within tube 9, being threadedly connected at its lower end to a nipple 23 mounted in the nose of the member 15, and extending upwardly through the bore of the annular plug 8 and clamped in position by a clamping nut 24 secured to the upper end thereof. A port 25 is formed in the nipple 23, thus subjecting the interior of tube 22 to the combined static head and velocity head of the stream of fluid at the center of the column 1, on the upstream side of the restriction. The upper end of the tube 22 is connected by a conduit 28 to one leg 29 of a manometer 30. The interior of the outer tube 9 is connected by a similar conduit 31 to the other leg 32 of the manometer.

The inner tube 22 is in effect a Pitot tube, while the outer tube 9 and ports 21 correspond to the piezometer tube connected to the throat of the standard Venturi tube. For a given rate of flow, the difference between the velocity head at port 25 and the pressure head at 21 will be greater than that between the pressure heads at the same points. The deflection of the mercury column will consequently be greater, resulting in a higher degree of accuracy of measurement, comparable with that obtainable in a Venturi meter only by restricting the size of the throat to a greater extend.

By mounting the obstruction member 15 on the tube 9 and supporting the latter in the elbow 5, many advantages are obtained. By supporting the member 15 from a remote point, the upper section of discharge column 1 may be a single continuous tube extending at least twenty column diameters upstream from the obstruction member, thereby insuring maximum uniformity of flow by eliminating threaded connections between column sections within this region. The degree of accuracy of the measurement may be increased by making this section of column of brass or other non-corrodible material, of uniform circular cross-section throughout its length. The resilient spider 16, 17 is located a sufficient distance above the restriction 20 so as not to interfere with the uniformity of flow at the measuring points. By disconnecting the elbow flanges, the elbow 5 and the meter may be removed as a unit, without disturbing the position of the discharge column. The rubber spider supports the member 15 concentric with the column, and is removable therewith, serving as a guide member during insertion and removal.

Manipulation of the meter from a remote point has the distinct advantage of permitting the installation of the meter in a conduit at a point which is inaccessible from the outside, making it possible to dispense with the usual approach pipe and Venturi tube in the open.

While I have shown, for purpose of illustration, an obstruction member generally in the form of a double cone, it will be understood that the member 15 may take any desired shape. It is preferable, however, that it be streamlined to some degree to avoid excessive turbulence at the measuring points.

In Fig. 2 I have shown a slightly modified form of mounting for the primary element of the meter. In this instance a T 5' is substituted for the elbow 5 of Fig. 1, and the plug 8' is threaded into a central opening 7' in a removable plate 6' detachably secured to the T. Otherwise this form of the invention is identical with that shown in Fig. 1. This form has the advantage of greater ease of removal of the meter, since it is unnecessary to remove the T for this purpose, the meter being insertible and removable through the T after detaching the cover plate 6'.

The restriction 15' of the form of the invention illustrated in Fig. 2 is also modified slightly by the provision of a nipple 23' having a sharply tapered nose, instead of the blunt nose of the nipple 23 of Fig. 1. The sharply tapered nose, decreasing downwardly to a narrow ledge around the opening 25', splits and guides the stream into the annular channel 20'.

I claim:

A flow meter comprising a restriction member adapted to be supported within a conduit in concentric relation thereto and defining therewith an annular channel of restricted cross-section, an elongated supporting member extending from the restriction member to a remote point on the downstream side of said restriction member, said supporting member and restriction member being insertible as a unit into the conduit at said remote point and movable axially within the conduit to operative position, a centering spider associated with said restriction member and disposed downstream with respect to said annular channel at a distance therefrom sufficient to avoid interference with the uniformity of flow through the channel, said spider being movable with said supporting and restriction members axially within the conduit and having slidable engagement with the conduit, said restriction member having a forwardly directed orifice therein on the upstream side of said channel and a laterally directed orifice communicating directly with the channel, and pressure conduits associated with said supporting member and connected at one end to said orifices and adapted to be connected to a pressure-responsive indicator at points beyond said remote point.

ALADAR HOLLANDER.